May 6, 1969            K. W. RANDALL            3,442,539
HOSE SWIVEL ASSEMBLY FOR HIGH PRESSURE HYDRAULIC FLUID
Filed Aug. 11, 1967
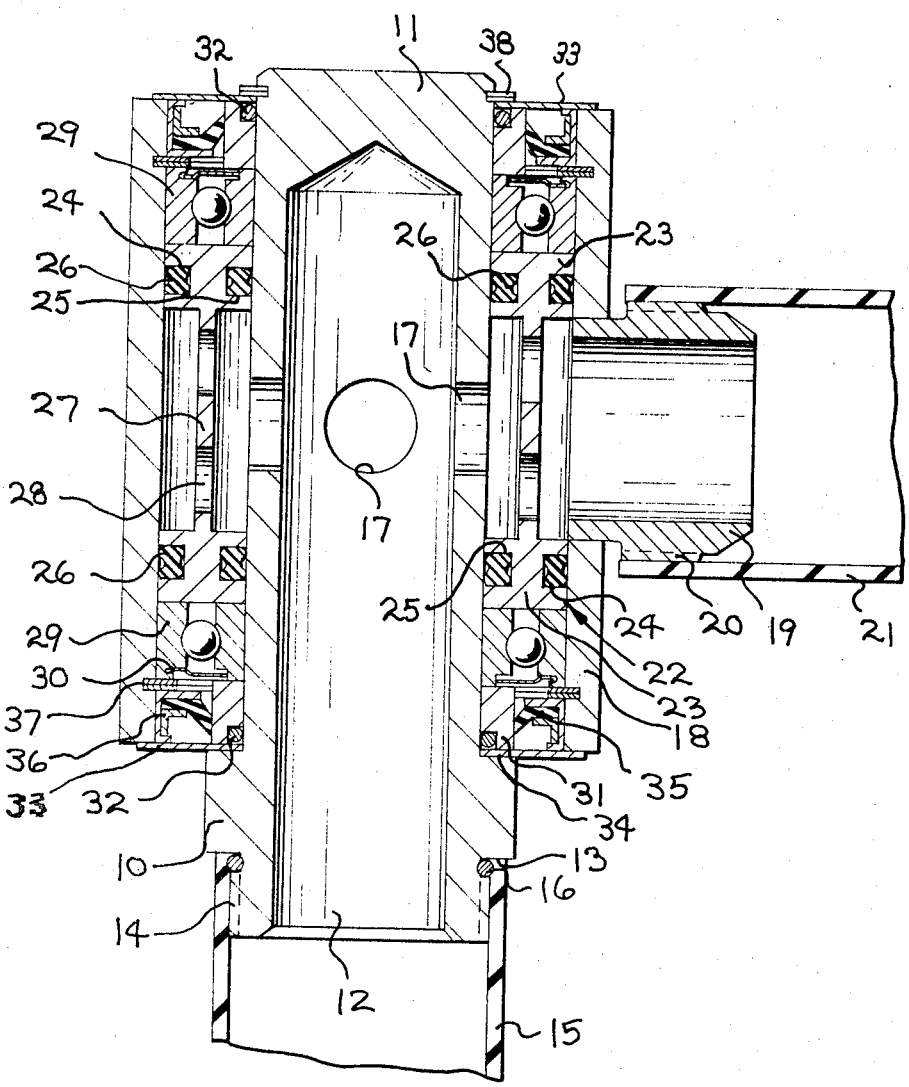
INVENTOR
KENNETH W. RANDALL
BY
ATTORNEY

United States Patent Office 3,442,539
Patented May 6, 1969

3,442,539
HOSE SWIVEL ASSEMBLY FOR HIGH PRESSURE HYDRAULIC FLUID
Kenneth W. Randall, Indianapolis, Ind., assignor to Insley Manufacturing Corporation, Indianapolis, Ind., a corporation of Indiana
Filed Aug. 11, 1967, Ser. No. 660,006
Int. Cl. F16l 41/00, 5/02, 27/08
U.S. Cl. 285—190          1 Claim

ABSTRACT OF THE DISCLOSURE

A hose swivel assembly for high pressure hydraulic fluid in which a floating self-contained high pressure sealing member responsive to the hydraulic pressure fluid is interposed between a tubular bearing section and a housing section. An antifriction bearing unit is arranged at each end of the sealing member and any end thrust on the sealing member is transmitted through the respective antifriction bearing unit to a thrust ring with which is associated a device for excluding dirt and foreign matter from the rotating parts.

SUMMARY OF THE INVENTION

Hose swivel assemblies for high pressure hydraulic fluid are used in many places but a particularly important use is on dirt handling equipment, such for example as front end loaders where such assemblies are subjected to hard usage and shocks and jars, which require a sturdy and rugged structure. The assembly according to this invention is designed with a minimum of parts which can be manufactured without difficulty or sizeable expense and which provide a hydraulic seal simply and efficiently. A sealing member which is hydraulically balanced so that it can float between the relatively rotatable parts, not only affords the desired sealing action but also transmits any thrust through an antifriction bearing unit to a thrust ring in one direction or the other. Cooperating with each thrust ring is a seal for excluding dirt and foreign material from the rotating parts, so that a minimum of space is required for the purpose.

BRIEF DESCRIPTION OF THE DRAWING

The figure is a longitudinal sectional elevation of a hose swivel assembly through which high pressure hydraulic fluid passes and which includes a floating high pressure sealing member.

DESCRIPTION OF THE PREFERRED EMBODIMENT

The illustrated embodiment of the invention comprises a tubular bearing section 10, having a closed outer end 11 and an open inner end 12. The inner end portion is formed with an external shoulder 13 and the reduced end portion is threaded at 14 to receive an inlet tube 15, an O-ring 16 providing a liquid tight seal for the tube 15. Hydraulic fluid under pressure is introduced to the bearing section 10 from the tube 15 and passes from the tube through a series of radial holes or ports 17.

Enclosing the major portion of the bearing section 10 is an open ended tubular housing 18 which is provided with a centrally disposed rigid outlet nozzle 19 generally aligned with the ports 17. The nozzle 19 has a threaded outer surface 20 to receive an outlet tube 21. The tubular housing 18 is spaced from the bearing section 10 by an interposed floating self-contained high pressure sealing member 22, which is in the form of a sleeve having at each end an annular head 23 which has sliding contact with the inner surface of the housing 18 and the outer surface of the bearing section 10. Sealing is effected between the heads 23 and the adjacent surfaces by elastomeric sealing rings 26. As shown, each head has an external annular groove 24 and an internal annular groove 25 and in each of these grooves is a sealing ring 26 which resiliently engages the respective bearing surface. Connecting the heads 23 is an integral tubular connecting web 27 which is disposed centrally of the heads 23. The tubular connecting web 27 is provided with two laterally spaced rows of ports 28 which as shown on the drawing, are out of registry with the ports 17 in the bearing section 10. It will be understood that the pressure of the hydraulic fluid from the bearing section 10 imposes equal pressure on the inner faces of the heads 23 and in view of such equal pressure, the sealing member 22 can float in the space between the housing 18 and bearing section 10.

Engaging the outer side of each head 23 is a ball bearing unit 29 to afford relatively free swivelling movement of the tubular housing 18 relative to the bearing section 10. Any lateral thrust imposed upon the sealing member 22 is transmitted through the respective ball bearing unit 29 to a thrust ring 31. It will be observed that there is a thrust ring 31 on the outer side of each of the ball bearing units 29 and the thrust against the lower thrust ring is transmitted to an internal shoulder 34 on the bearing section 10. A sheet metal disc annulus 33 is interposed between the lower thrust ring 31 and the shoulder 34, the annulus extending to the housing section to close the space between the end of the housing section and the bearing section. Each ball bearing unit 29 has a sheet metal shield 30 and carried by the tubular housing 18 is an elastomeric wiping gasket ring 35 secured by a retainer 36. Discs 37 notched in the housing 18 are interposed between the respective ball bearing unit 29 and the gasket retainer 36. It will be observed that the exposed end of the gasket 35 has a wiping action against the outer surface of the respective thrust ring 31 thereby to exclude dirt and foreign material from the rotating assemblies.

On the outer or upper end of the bearing section 10 the disc annulus 33 abuts against rings 38 which are notched in the closed end portion 11. For sealing purposes, an O-ring 32 is interposed between each thrust ring and the bearing section 10.

From the above description, it will be manifest that the sealing member 22 is hydraulically pressure balanced and is free to float between the bearing section 10 and the housing 18, floating movement taking place on the sealing rings 26. All external forces are taken up by the ball bearing units 29. Any side thrust imposed is transmitted through the ball bearing units 29 to the thrust rings 31. The thrust rings not only serve to take up side thrusts, but also serve through the structure described, to exclude dirt and foreign material from the rotating parts. Another advantage of the structure above described, is that the construction of the tubular bearing section 10 and the tubular housing 18 is such that these parts can be readily machined because of the straight surface free from steps.

Numerous changes in details of construction, arrangement and choice of materials may be effected without departing from the spirit of the invention.

What I claim is:
1. A hose swivel assembly for high pressure hydraulic fluid comprising:
   a tubular bearing member closed at one end and open at the other end for the passage of hydraulic fluid under pressure;
   a radial opening in said bearing member;
   a tubular housing surrounding said bearing member and spaced therefrom;
   an outlet nozzle intermediate the ends of said housing;
   a sealing member slidingly fitting the space between said bearing member and housing, said sealing member comprising a sleeve, an annular head at each end of said sleeve having sliding contact with the inner surface of said housing and the outer surface of said tubular bearing member, each head having oppositely facing grooves, an elastomeric sealing ring in each groove providing a seal between each head and said bearing member and housing respectively, and an apertured web connecting said heads and disposed centrally thereof to afford clearance for fluid flow;

the inner face of each head being exposed to hydraulic pressure of fluid passing from said bearing member to said outlet nozzle;

a ball bearing unit at the outer side of each head;

a thrust ring against which each bearing unit abuts for receiving any lateral thrust imposed on said sealing member;

abutment means for the outer side of each thrust ring, and a device interposed between said housing and each thrust ring for militating against the entrance of dirt and foreign material to the rotating parts.

References Cited

UNITED STATES PATENTS

| | | | |
|---|---|---|---|
| 2,933,321 | 4/1960 | Cascone | 285—190 X |
| 2,937,029 | 5/1960 | Colby | 285—98 X |
| 3,024,030 | 3/1962 | Koch | 285—190 X |

CARL W. TOMLIN, *Primary Examiner.*

W. L. SHEDD, *Assistant Examiner.*